United States Patent
Raghavan et al.

(10) Patent No.: US 12,402,050 B2
(45) Date of Patent: *Aug. 26, 2025

(54) NEIGHBOR CELL MEASUREMENTS

(71) Applicant: Apple Inc., Cupertino, CA (US)

(72) Inventors: Manasa Raghavan, Sunnyvale, CA (US); Qiming Li, Beijing (CN); Jie Cui, San Jose, CA (US); Yang Tang, San Jose, CA (US); Yushu Zhang, Beijing (CN); Huaning Niu, San Jose, CA (US); Xiang Chen, Campbell, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/583,439

(22) Filed: Feb. 21, 2024

(65) Prior Publication Data

US 2024/0251310 A1    Jul. 25, 2024

Related U.S. Application Data

(63) Continuation of application No. 17/438,204, filed as application No. PCT/CN2021/092637 on May 10, 2021, now Pat. No. 11,963,055.

(51) Int. Cl.
*H04W 36/00*  (2009.01)
*H04B 17/318*  (2015.01)
*H04B 17/336*  (2015.01)

(52) U.S. Cl.
CPC ...... *H04W 36/0094* (2013.01); *H04B 17/318* (2015.01); *H04B 17/336* (2015.01); *H04W 36/0061* (2013.01); *H04W 36/0088* (2013.01)

(58) Field of Classification Search
CPC ......... H04W 36/0094; H04W 36/0061; H04W 36/0088; H04B 17/318; H04B 17/336
See application file for complete search history.

(56) References Cited

U.S. PATENT DOCUMENTS

| 2017/0026861 A1 | 1/2017 | Tseng |
| 2017/0086087 A1 | 3/2017 | Kim |

(Continued)

FOREIGN PATENT DOCUMENTS

| CN | 103262460 | 8/2013 |
| CN | 110381531 | 10/2019 |

(Continued)

OTHER PUBLICATIONS

International Search Report and Written Opinion for PCT/CN2021/092637; Jan. 26, 2022.

(Continued)

*Primary Examiner* — Saad A. Waqas
(74) *Attorney, Agent, or Firm* — Kowert, Hood, Munyon, Rankin & Goetzel, P.C.

(57) ABSTRACT

This disclosure relates to techniques for configuring, performing, and reporting neighbor cell measurements in a wireless communication system. A base station of a serving cell may provide configuration information relevant to performing layer 1 (L1) measurements based on reference signals of one or more neighbor cells. A UE may perform L1 inter-frequency measurements of the neighbor cell(s) based on the configuration. The UE may report the measurements.

20 Claims, 10 Drawing Sheets

| Configuration | $T_{Inter\text{-}L1\text{-}RSRP\_Measurement\_Period\_SSB}$ (ms) |
|---|---|
| non-DRX | $max(T_{Report}, ceil(M*P)*max(T_{SSB}, MGRP))*CSSF_{inter}$ |
| DRX cycle ≤ 320ms | $max(T_{Report}, ceil(K*M*P)*max(T_{DRX}, T_{SSB}, MGRP))*CSSF_{inter}$ |
| DRX cycle > 320ms | $ceil(M*P)*T_{DRX}*CSSF_{inter}$ |

(56) References Cited

U.S. PATENT DOCUMENTS

| | | | |
|---|---|---|---|
| 2019/0274146 A1* | 9/2019 | Tang | H04W 24/08 |
| 2019/0306734 A1 | 10/2019 | Huang | |
| 2020/0107337 A1* | 4/2020 | Lin | H04L 1/0026 |
| 2020/0137604 A1* | 4/2020 | Chen | H04W 24/10 |
| 2021/0028852 A1 | 1/2021 | Hwang | |
| 2022/0038927 A1* | 2/2022 | Manolakos | G01S 5/0221 |

FOREIGN PATENT DOCUMENTS

| | | | |
|---|---|---|---|
| CN | 111149380 | 5/2020 | |
| CN | 111247752 | 6/2020 | |
| CN | 111727635 | 9/2020 | |
| JP | 2023547866 A * | 11/2023 | |
| WO | 2013086955 | 6/2013 | |
| WO | WO-2013086955 A1 * | 6/2013 | H04W 24/10 |
| WO | 2021029077 | 2/2021 | |
| WO | 2021031962 | 2/2021 | |
| WO | WO-2021031962 A1 * | 2/2021 | H04B 17/318 |
| WO | WO-2021064676 A1 * | 4/2021 | H04L 27/0006 |

OTHER PUBLICATIONS

Intel Corporation "Further Discussion on NR PRS RSTD Requirements for UE"; 3GPP TSG-RAN WG4 Meeting #94eBis R4-2003207; Apr. 30, 2020.

Extended European Search Report for EP Patent Application No. 21881359.0; Sep. 15, 2022.

Apple Inc. et al. "CR on AP-CSI-RS based L1-RSRP measurement R16"; 3GPP TSG-RAN4 Meeting #97-e RP-202444; Nov. 2, 2020.

Office Action for CN Application No. 202180006347.5; May 17, 2025.

Apple Inc "Discussion on reply LS on TCI State Update for L1/L2-Centric Inter-Cell Mobility", 3GPP TSG-RAN WG4 Meeting # 98-bis-e R4-2104848; Apr. 12, 2021.

* cited by examiner

```
SSB-MTC-L1-r17 ::=           SEQUENCE {
    periodicityAndOffset-r16     CHOICE {
        sf5-r-17                         INTEGER (0..4),
        sf10-r-17                        INTEGER (0..9),
        sf20-r-17                        INTEGER (0..19),
        sf40-r-17                        INTEGER (0..39),
        sf80-r-17                        INTEGER (0..79),
        sf160-r-17                       INTEGER (0..159),
    },
    duration-r17                 ENUMERATED {sf1, sf2, sf3, sf4, sf5},
    pci-List-r-17                SEQUENCE (SIZE (1..maxNrofPCIsPerSMTC)) OF PhysCellId
OPTIONAL
    ssb-ToMeasure-r17            SetupRelease { SSB-ToMeasure }
OPTIONAL    -- Need M
}
```

FIG. 6

| Configuration | $T_{Inter\text{-}L1\text{-}RSRP\_Measurement\_Period\_SSB}$ (ms) |
|---|---|
| non-DRX | $max(T_{Report}, ceil(M*P)*max(T_{SSB}, MGRP))*CSSF_{inter}$ |
| DRX cycle ≤ 320ms | $max(T_{Report}, ceil(K*M*P)*max(T_{DRX}, T_{SSB}, MGRP))*CSSF_{inter}$ |
| DRX cycle > 320ms | $ceil(M*P)*T_{DRX}*CSSF_{inter}$ |

FIG. 7

| Configuration | $T_{Inter\text{-}L1\text{-}RSRP\_Measurement\_Period\_SSB}$ (ms) |
|---|---|
| non-DRX | $max(T_{Report}, ceil(M*P*N)*max(T_{SSB}, MGRP))*CSSF_{inter}$ |
| DRX cycle ≤ 320ms | $max(T_{Report}, ceil(1.5*M*P*N)*max(T_{DRX}, T_{SSB}, MGRP))*CSSF_{inter}$ |
| DRX cycle > 320ms | $ceil(1.5*M*P*N)*T_{DRX}*CSSF_{inter}$ |

FIG. 8

| Configuration | $T_{Inter-L1-RSRP\_Measurement\_Period\_CSI-RS}$ (ms) |
|---|---|
| non-DRX | $max(T_{Report}, ceil(M*P)*max(T_{CSI-RS}, MGRP))*CSSF_{inter}$ |
| DRX cycle ≤ 320ms | $max(T_{Report}, ceil(K*M*P)*max(T_{DRX}, T_{CSI-RS}, MGRP))*CSSF_{inter}$ |
| DRX cycle > 320ms | $ceil(M*P)*T_{DRX}*CSSF_{inter}$ |

FIG. 9

| Configuration | $T_{Inter-L1-RSRP\_Measurement\_Period\_CSI-RS}$ (ms) |
|---|---|
| non-DRX | $max(T_{Report}, ceil(M*P*N)*max(T_{CSI-RS}, MGRP))*CSSF_{inter}$ |
| DRX cycle ≤ 320ms | $max(T_{Report}, ceil(1.5*M*P*N)*max(T_{DRX}, T_{CSI-RS}, MGRP))*CSSF_{inter}$ |
| DRX cycle > 320ms | $ceil(M*P*N)*T_{DRX}*CSSF_{inter}$ |

FIG. 10

| Configuration | $T_{Inter\text{-}L1\text{-}SINR\_Measurement\_Period\_CSI\text{-}RS\_CMR\_Only}$ (ms) |
|---|---|
| non-DRX | $max(T_{Report}, ceil(M*P)*max(T_{CSI\text{-}RS}, MGRP))*CSSF_{inter}$ |
| DRX cycle ≤ 320ms | $max(T_{Report}, ceil(1.5*M*P)*max(T_{DRX}, T_{CSI\text{-}RS}, MGRP))*CSSF_{inter}$ |
| DRX cycle > 320ms | $ceil(M*P)*T_{DRX}*CSSF_{inter}$ |

FIG. 11

| Configuration | $T_{L1\text{-}SINR\_Measurement\_Period\_CSI\text{-}RS\_CMR\_Only}$ (ms) |
|---|---|
| non-DRX | $max(T_{Report}, ceil(M*P*N)*max(T_{CSI\text{-}RS}, MGRP))*CSSF_{inter}$ |
| DRX cycle ≤ 320ms | $max(T_{Report}, ceil(1.5*M*P*N)*max(T_{DRX}, T_{CSI\text{-}RS}, MGRP))*CSSF_{inter}$ |
| DRX cycle > 320ms | $ceil(M*P*N)*T_{DRX}*CSSF_{inter}$ |

FIG. 12

| Configuration | $T_{Inter\text{-}L1\text{-}SINR\_Measurement\_Period\_SSB\_CMR\_IMR}$ (ms) |
|---|---|
| non-DRX | $max(T_{Report}, ceil(M*P)*max(T_{SSB}, MGRP))*CSSF_{inter}$ |
| DRX cycle ≤ 320ms | $max(T_{Report}, ceil(1.5*M*P)*max(T_{DRX}, T_{SSB}, MGRP))*CSSF_{inter}$ |
| DRX cycle > 320ms | $ceil(M*P)*T_{DRX}*CSSF_{inter}$ |

FIG. 13

| Configuration | $T_{Inter\text{-}L1\text{-}SINR\_Measurement\_Period\_SSB\_CMR\_IMR}$ (ms) |
|---|---|
| non-DRX | $max(T_{Report}, ceil(M*P*N)*max(T_{SSB}, MGRP))*CSSF_{inter}$ |
| DRX cycle ≤ 320ms | $max(T_{Report}, ceil(1.5*M*P*N)*max(T_{DRX}, T_{SSB}, MGRP))*CSSF_{inter}$ |
| DRX cycle > 320ms | $ceil(1.5*M*P*N)*T_{DRX}*CSSF_{inter}$ |

FIG. 14

| Configuration | $T_{Inter\text{-}L1\text{-}SINR\_Measurement\_Period\_CSI\text{-}RS\_CMR\_IMR}$ (ms) |
|---|---|
| non-DRX | $\max(T_{Report}, \text{ceil}(M*P)*\max(T_{CSI\text{-}RS}, MGRP))*CSSF_{inter}$ |
| DRX cycle ≤ 320ms | $\max(T_{Report}, \text{ceil}(1.5*M*P)*\max(T_{DRX}, T_{CSI\text{-}RS}, MGRP))*CSSF_{inter}$ |
| DRX cycle > 320ms | $\text{ceil}(M*P)*T_{DRX}*CSSF_{inter}$ |

FIG. 15

| Configuration | $T_{Inter\text{-}L1\text{-}SINR\_Measurement\_Period\_CSI\text{-}RS\_CMR\_IMR}$ (ms) |
|---|---|
| non-DRX | $\max(T_{Report}, \text{ceil}(M*P*N)*\max(T_{CSI\text{-}RS}, MGRP))*CSSF_{inter}$ |
| DRX cycle ≤ 320ms | $\max(T_{Report}, \text{ceil}(1.5*M*P*N)*\max(T_{DRX}, T_{CSI\text{-}RS}, MGRP))*CSSF_{inter}$ |
| DRX cycle > 320ms | $\text{ceil}(M*P*N)*T_{DRX}*CSSF_{inter}$ |

FIG. 16

NEIGHBOR CELL MEASUREMENTS

PRIORITY INFORMATION

This application is a continuation of U.S. patent application Ser. No. 17/438,204, titled "Neighbor Cell Measurements," filed Sep. 10, 2021, which is a U.S. National Stage application of International Application No. PCT/CN2021/092637, filed May 10, 2021, titled "Neighbor Cell Measurements", which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communications, and more particularly to systems, apparatuses, and methods for neighbor cell measurements in a wireless communication system.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications. Accordingly, improvements in the field are desired.

SUMMARY

Embodiments are presented herein of apparatuses, systems, and methods for neighbor cell measurements in a wireless communication system. Such neighbor cell measurements may be or include inter-frequency layer 1 (L1) measurements.

A UE may establish a wireless link with a serving cell. The serving cell may provide configuration information to the UE and the UE may receive the configuration information. The UE may determine, based on the configuration information, a first measurement period for inter-frequency layer 1 (L1) measurement on a first neighbor cell (or multiple neighbor cells). The UE may receive, from the first neighbor cell (or cells), at least one reference signal. The reference signal may be CSI-RS, SSB, etc. The UE may perform at least one L1 measurement of the at least one reference signal according to the first measurement period for inter-frequency L1 measurement on the first neighbor cell. The measurement may be L1-SINR and/or L1-RSRP, among various possibilities. The UE may transmit, to the serving cell, a report of the at least one L1 measurement.

Note that the techniques described herein may be implemented in and/or used with a number of different types of devices, including but not limited to base stations, access points, cellular phones, portable media players, tablet computers, wearable devices, unmanned aerial vehicles, unmanned aerial controllers, automobiles and/or motorized vehicles, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIG. 6 illustrates an exemplary measurement configuration message, according to some embodiments; and FIGS. 7-16 illustrate exemplary tables for measurement configuration, according to some embodiments.

Figure 1:
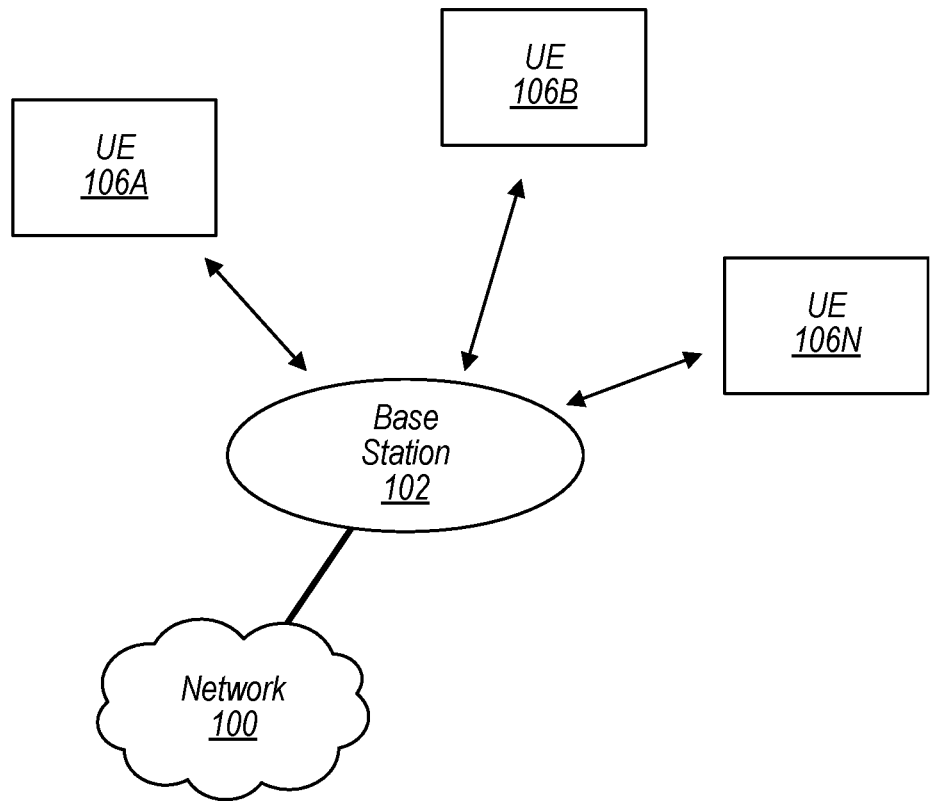
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
TRP: Transmission-Reception-Point
PDCCH: Physical Downlink Control Channel
PDSCH: Physical Downlink Shared Channel
PUCCH: Physical Uplink Control Channel
PUSCH: Physical Uplink Shared Channel
DCI: Downlink Control Information
CORESET: Control Resource Set
QCL: Quasi-Co-Located or Quasi-Co-Location
CSI: Channel State Information
CSI-RS: Channel State Information Reference Signals
CSI-IM: Channel State Information Interference Management
SRS: Sounding Reference Signal
CMR: Channel Measurement Resource
IMR: Interference Measurement Resource
CQI: Channel Quality Indicator
PMI: Precoding Matrix Indicator
RI: Rank Indicator
RSTD: Reference Signal Time Difference
CSSF: Carrier-specific scaling factor
MGRP: Measurement Gap Repetition Period
ZP: Zero Power
NZP: Non-zero Power

Terms

The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™_based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
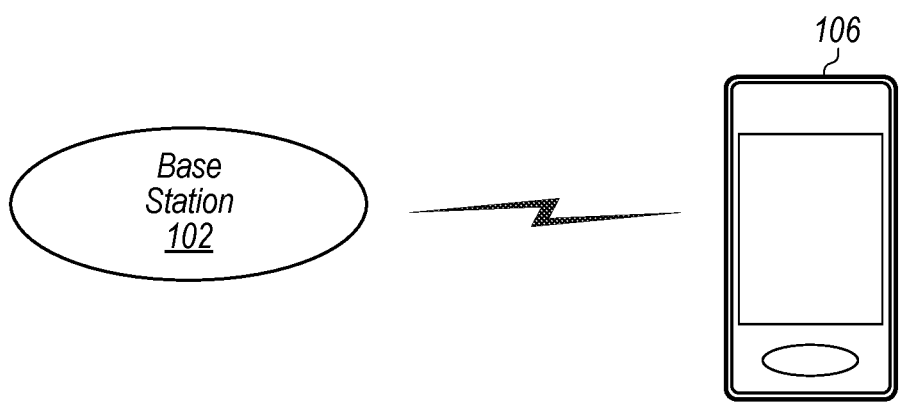
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to perform neighbor cell measurements in a wireless communication system in accordance with techniques for aligning wireless device and cellular network expectations and behavior in conjunction with neighbor cell measurements, such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments.

The UE 106 may be a device with wireless network connectivity such as a mobile phone, a hand-held device, a wearable device, a computer or a tablet, an unmanned aerial vehicle (UAV), an unmanned aerial controller (UAC), an automobile, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
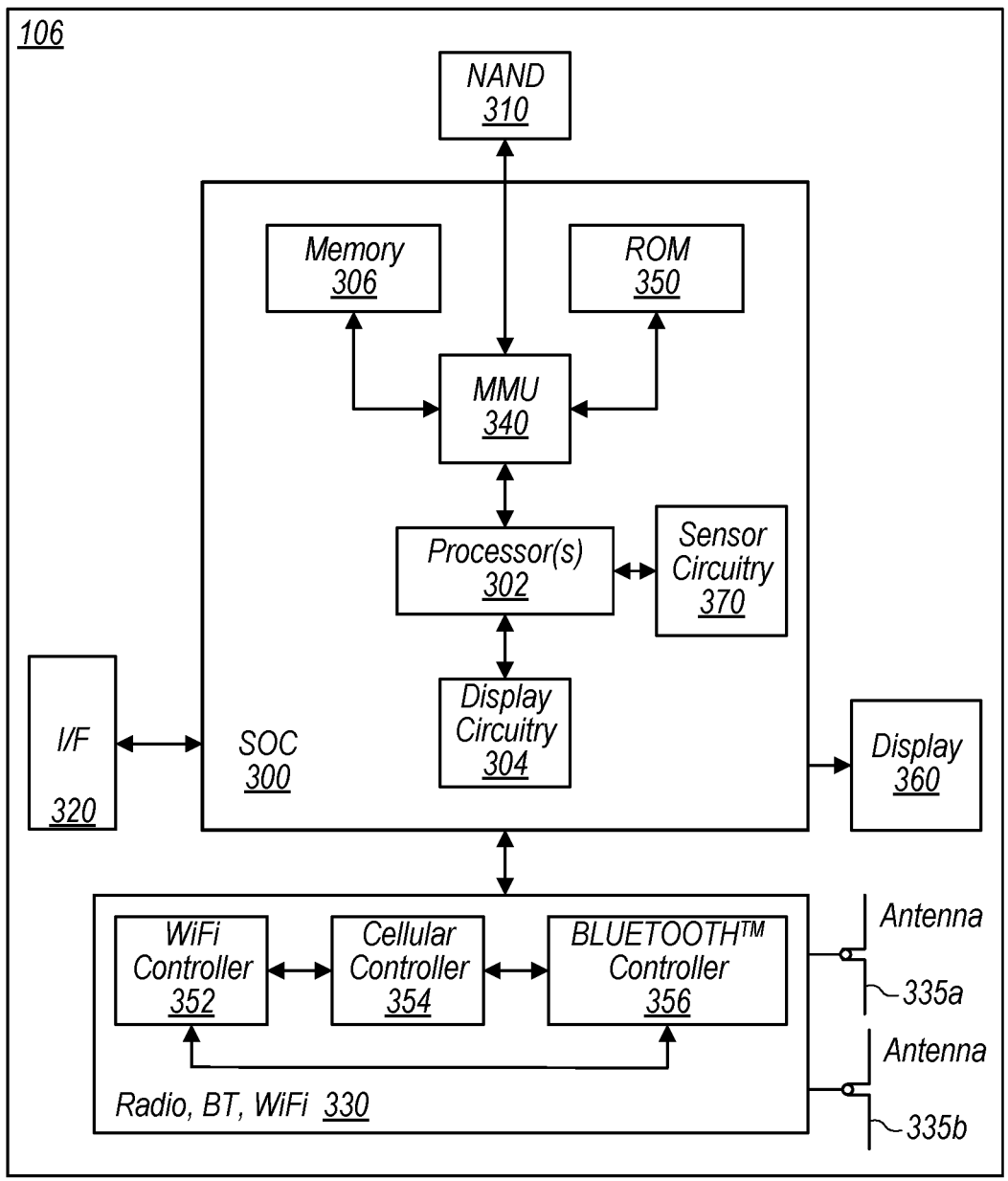
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include sensor circuitry 370, which may include components for sensing or measuring any of a variety of possible characteristics or parameters of the UE 106. For example, the sensor circuitry 370 may include motion sensing circuitry configured to detect motion of the UE 106, for example using a gyroscope, accelerometer, and/or any of various other motion sensing components. As another possibility, the sensor circuitry 370 may include one or more temperature sensing components, for example for measuring the temperature of each of one or more antenna panels and/or other components of the UE 106. Any of various other possible types of sensor circuitry may also or alternatively be included in UE 106, as desired. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform neighbor cell measurements in a wireless communication system in accordance with techniques for aligning wireless device and cellular network expectations and behavior in conjunction with neighbor cell measurements, such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform neighbor cell measurements in a wireless communication system in accordance with techniques for aligning wireless device and cellular network expectations and behavior in conjunction with neighbor cell measurements according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
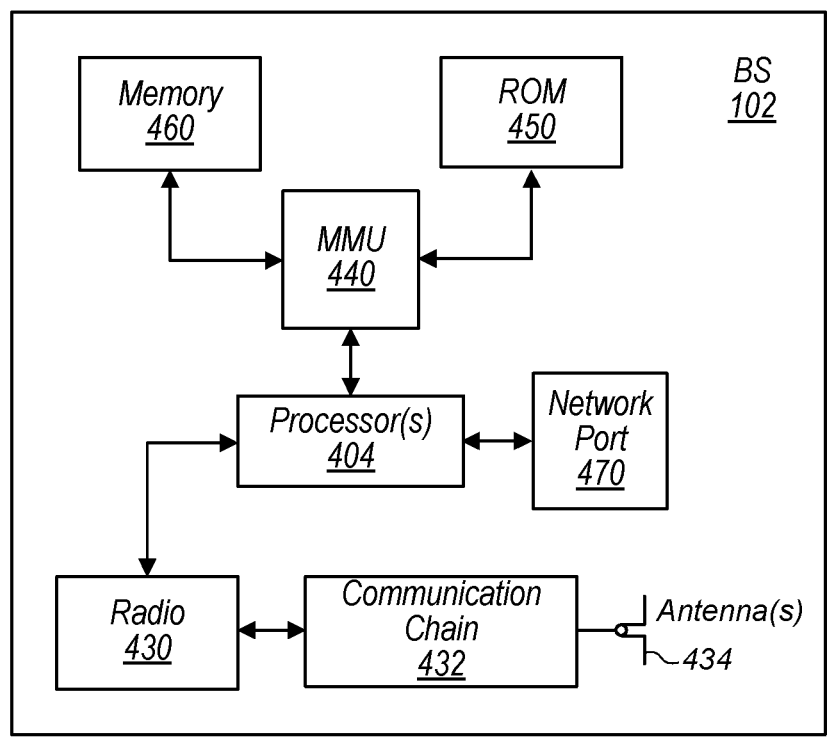
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard.

Reference Signals

A wireless device, such as a user equipment, may be configured to perform a variety of tasks that include the use of reference signals (RS) provided by one or more cellular base stations. For example, initial access and beam measurement by a wireless device may be performed based at least in part on synchronization signal blocks (SSBs) provided by one or more cells provided by one or more cellular base stations within communicative range of the wireless device. Another type of reference signal commonly provided in a cellular communication system may include channel state information (CSI) RS. Various types of CSI-RS may be provided for tracking (e.g., for time and frequency offset tracking), beam management (e.g., with repetition configured, to assist with determining one or more beams to use for uplink and/or downlink communication), and/or channel measurement (e.g., CSI-RS configured in a resource set for measuring the quality of the downlink channel and reporting information related to this quality measurement to the base station), among various possibilities. For example, in the case of CSI-RS for CSI acquisition, the UE may periodically perform channel measurements and send channel state information (CSI) to a BS. The base station can then receive and use this channel state information to determine an adjustment of various parameters during communication with the wireless device. In particular, the BS may use the received channel state information to adjust the coding of its downlink transmissions to improve downlink channel quality.

In many cellular communication systems, the base station may transmit some or all such reference signals (or pilot signals), such as SSB and/or CSI-RS, on a periodic basis. In some instances, aperiodic reference signals (e.g., for aperiodic CSI reporting) may also or alternatively be provided.

As a detailed example, in the 3GPP NR cellular communication standard, the channel state information fed back from the UE based on CSI-RS for CSI acquisition may include one or more of a channel quality indicator (CQI), a precoding matrix indicator (PMI), a rank indicator (RI), a CSI-RS Resource Indicator (CRI), a SSBRI (SS/PBCH Resource Block Indicator, and a Layer Indicator (LI), at least according to some embodiments.

Channel quality information ray be provided to the base station for link adaptation, e.g., for providing guidance as to which modulation & coding scheme (MCS) the base station should use when it transmits data. For example, when the downlink channel communication quality between the base station and the UE is determined to be high, the UE may feed back a high CQI value, which may cause the base station to transmit data using a relatively high modulation order and/or a low channel coding rate. As another example, when the downlink channel communication quality between the base station and the UE is determined to be low, the UE may feed back a low CQI value, which may cause the base station to transmit data using a relatively low modulation order and/or a high channel coding rate.

PMI feedback may include preferred precoding matrix information, and may be provided to a base station in order to indicate which MIMO precoding scheme the base station should use. In other words, the UE may measure the quality of a downlink MIMO channel between the base station and the UE, based on a pilot signal received on the channel, and may recommend, through PMI feedback, which MIMO precoding is desired to be applied by the base station. In some cellular systems, the PMI configuration is expressed in matrix form, which provides for linear MIMO precoding. The base station and the UE may share a codebook composed of multiple precoding matrixes, where each MIMO precoding matrix in the codebook may have a unique index. Accordingly, as part of the channel state information fed back by the IE, the PMI may include an index (or possibly multiple indices) corresponding to the most preferred MIMO precoding matrix (or matrixes) in the codebook. This may enable the UE to minimize the amount of feedback information. Thus, the PMI may indicate which precoding matrix from a codebook should be used for transmissions to the UE, at least according to some embodiments.

The rank indicator information (RI feedback) may indicate a number of transmission layers that the UE determines can be supported by the channel, e.g., when the base station and the UE have multiple antennas, which may enable multi-layer transmission through spatial multiplexing. The RI and the PMI may collectively allow the base station to know which precoding needs to be applied to which layer, e.g., depending on the number of transmission layers.

In some cellular systems, a PMI codebook is defined depending on the number of transmission layers. In other words, for R-layer transmission, N number of $N_t \times R$ matrixes may be defined (e.g., where R represents the number of layers. NE represents the number of transmitter antenna ports, and N represents the size of the codebook). In such a scenario, the number of transmission layers (R) may conform to a rank value of the precoding matrix ($N_t \times R$ matrix), and hence in this context R may be referred to as the "rank indicator (RI)".

Thus, the channel state information may include an allocated rank (e.g., a rank indicator or RI). For example, a MIMO-capable UE communicating with a BS may include four receiver chains, e.g., may include four antennas. The BS may also include four or more antennas to enable MIMO communication (e.g., 4×4 MIMO). Thus, the UE may be capable of receiving up to four (or more) signals (e.g., layers) from the BS concurrently. Layer to antenna mapping may be applied, e.g., each layer may be mapped to any number of antenna ports (e.g., antennas). Each antenna port may send and/or receive information associated with one or more layers. The rank may comprise multiple bits and may indicate the number of signals that the BS may send to the UE in an upcoming time period (e.g., during an upcoming transmission time interval or TTI). For example, an indication of rank 4 may indicate that the BS will send 4 signals to the UE. As one possibility, the RI may be two bits in length (e.g., since two bits are sufficient to distinguish 4 different rank values). Note that other numbers and/or configurations of antennas (e.g., at either or both of the UE or the BS) and/or other numbers of data layers are also possible, according to various embodiments.

Figure 5:
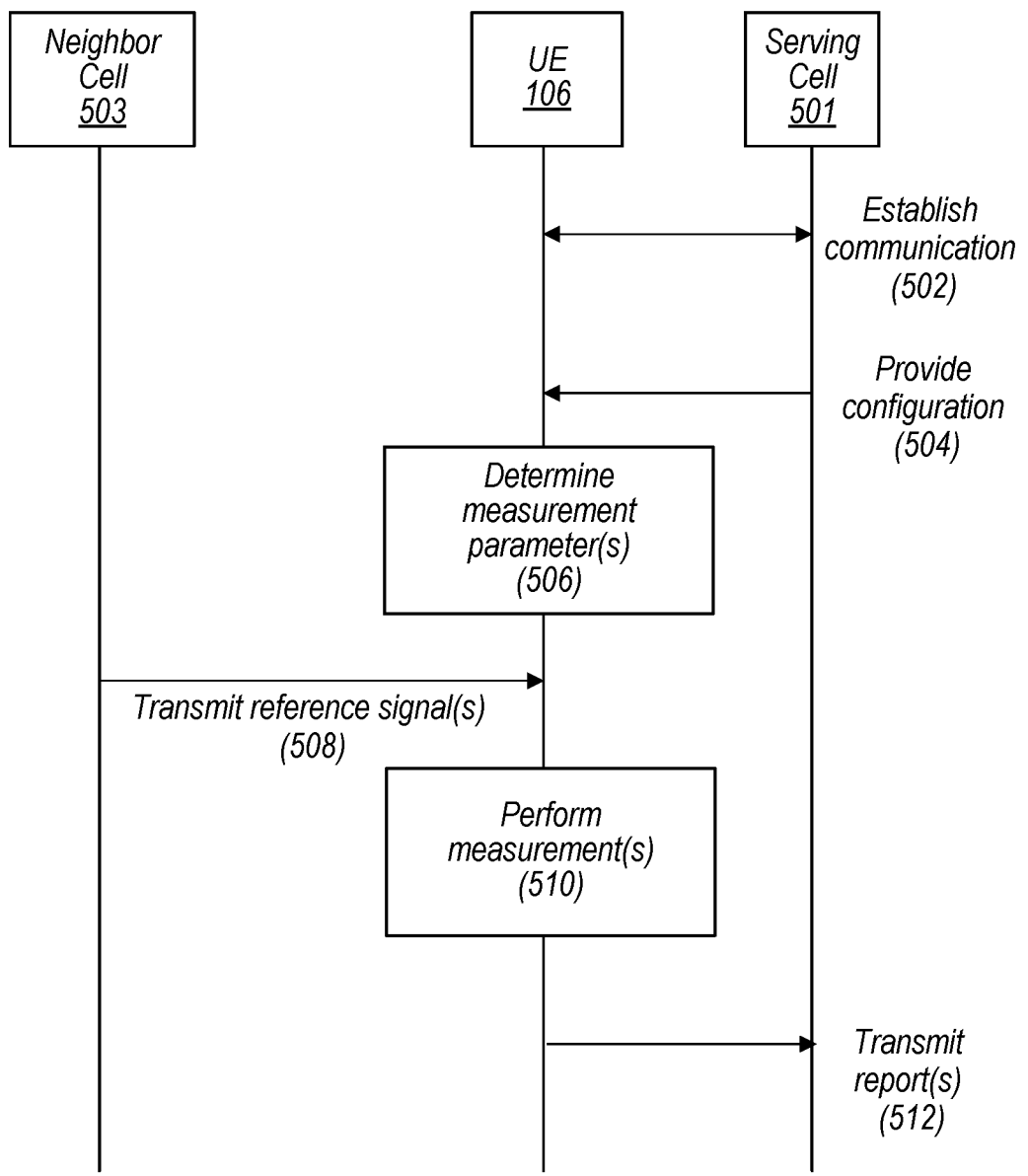
FIG. 5 is a flowchart diagram illustrating aspects of an exemplary possible method for a wireless device to perform neighbor cell measurements in a wireless communication system, according to some embodiments.

FIG. 5—Neighbor Cell Measurements

A wireless device in a cellular communication system may typically perform neighbor cell measurements (e.g., measurements of cells which may be nearby other than a current serving cell) and serving cell measurements at various times, e.g., in addition to performing data and control communications. For example, such measurements may support continued good reception and facilitate cell handover and re-selection, among various other uses. There may be numerous types of signals and channels that can be used for a variety of types of measurements and communications with neighboring and serving cells. Additionally, there may be numerous types of wireless devices, which may have differing capabilities, operating in a given cellular communication system.

In 3GPP releases 15 16, layer 1 (L1) measurement may (e.g., only) be configured for serving cell measurement. L1 measurement on neighbor cell(s) may not be supported. Intra-frequency L1 measurement on neighbor cell may be supported in release 17. However, inter-frequency L1 measurement on neighbor may also possible. For example, measurement requirements for neighbor cell inter-frequency L1 measurements may be included in technical specification (TS) 38.133 in the future.

In various embodiments described herein, the measurement period(s) for inter-frequency L1 measurement on neighbor cell(s) may be determined. For example, various embodiments may include any or all of the following measurements, among various possibilities: neighbor cell synchronization signal (SSB) based L1 reference signal received power (RSRP) measurement, neighbor cell channel state information (CSI) reference signal (RS, e.g., CSI-RS) based L1-RSRP measurement, neighbor cell L1 signal to interference and noise ratio (SINR) with SSB based channel measurement resource (CMR) and dedicated interference measurement resource (IMR) configured, neighbor cell L1-SINR with CSI-RS based CMR and no dedicated IMR configured, neighbor cell L1-SINR with CSI-RS based CMR and dedicated IMR configured.

In Release 17, multi-beam (e.g., multiple in multiple out (MIMO) enhancements to support L1 and/or L2 centric mobility and inter-cell multi transmission and reception point (mTRP) may be considered.

In some embodiments, neighbor cell measurements may be configured by SSB measurement timing configuration (SMTC). SMTC may be configured for L3 based neighbor cell measurements. SMTC periodicity may be common for measurement of all neighbor cells. For example, SMTC periodicity may be 160 ms. In some embodiments, however, the SSB of a neighbor cell to measure (e.g., CellX) may have a shorter periodicity, e.g., 40 ms. Thus, the UE may only measure during SMTC, and may thus not measure in some of the SSB periods. As a result, the measurement may take longer (e.g., 4 times longer).

One objective of L1 and/or L2 centric mobility may be faster inter-cell beam switch and/or handover. Thus, restricting such measurement to SMTC may extend the measurement period. Such extension of the measurement period may delay mobility (e.g., beam switch, handover, etc.).

In this disclosure, methods to enhance neighbor cell L1 measurements for L1 and/or L2 centric mobility and inter-cell mTRP are discussed.

To illustrate one such set of possible embodiments, FIG. 5 is a communication flow diagram illustrating a method for a UE to operate in a cellular communication system when neighbor cell measurements are configured in accordance with a framework for aligning wireless device and cellular network expectations and behavior in conjunction with neighbor cell measurements, at least according to some embodiments.

Aspects of the method of FIG. 5 may be implemented by a wireless device, e.g., in conjunction with one or more cellular base stations, such as a UE 106 in communication with a serving cell 501 and a neighbor cell 503 (or a plurality of neighbor cells 503). The serving cell 501 and neighbor cell 503 may be provided by one or more BS 102 and/or TRP(s). The UE 106 and/or BS 102 illustrated in and described with respect to various ones of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements. For example, one or more processors (or processing elements) (e.g., processor(s) 302, 404, baseband processor(s), processor(s) associated with communication circuitry such as 330, 430, or 432, processors associated with various core network elements, etc., among various possibilities) may cause a UE, network, network element, BS, or other device to perform such method elements.

Note that while at least some elements of the method of FIG. 5 are described in a manner relating to the use of communication techniques and/or features associated with 3GPP and/or NR specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method of FIG. 5 may operate as follows.

The UE may establish communication via a wireless link with the serving cell (502), according to some embodiments. For example, the wireless link may include a cellular link according to 5G NR. The UE may establish a session with an AMF entity of a cellular network by way of the serving cell, which may operate according to NR. As another possibility, the wireless link may include a cellular link according to LTE. For example, the UE may establish a session with a mobility management entity (MME) of the cellular network by way of the serving cell, which may operate according to LTE. Other types of cellular links and managing device(s) are also possible, and the cellular network may also or alternatively operate according to another cellular communication technology (e.g., UMTS, CDMA2000, GSM, etc.), according to various embodiments.

Establishing the wireless link may include establishing a RRC connection. Establishing the RRC connection may include configuring various parameters for communication between the UE and the serving cell, establishing context information, and/or any of various other possible features, e.g., relating to establishing an air interface for the UE to perform cellular communication with a cellular network associated with the serving cell.

At least according to some embodiments, the UE may establish multiple wireless links, e.g., with multiple TRPs of the cellular network, according to a multi-TRP configuration. In such a scenario, the UE may be configured (e.g., via RRC signaling) with one or more transmission control indicators (TCIs), e.g., which may correspond to various beams that can be used to communicate with the TRPs. Further, it may be the case that one or more configured transmission control indication (TCI) states may be activated by media access control (MAC) control element (CE) for the UE at a particular time.

At least in some instances, establishing the wireless link(s) may include the UE providing capability information for the UE. Such capability information may include information relating to any of a variety of types of UE capabilities.

In some instances, the capability information may include information indicating whether the UE supports simultaneously receiving reference signals for neighbor cell measurement. For example, the capability information could indicate whether the UE supports concurrent CSI-RS based neighbor cell measurement and serving cell PDCCH or PDSCH reception, e.g., with different subcarrier spacing (also called numerology). Such capability information may relate to one or more of 3GPP layer 1 (L1) or layer 3 (L3) neighbor cell measurement for one or more of intra-frequency measurement or inter-frequency measurement. Similarly, the capability information may indicate whether the UE supports simultaneously receiving reference signals for neighbor cell measurement and reference signals for serving cell measurement and any restriction on such ability (e.g., based on different numerology). As another example, such capabilities could include one or more numbers of L1 measurements the wireless device is capable of performing (e.g., the maximum number of L1 measurements the wireless device is capable of performing in each of one or more scenarios or sets of conditions, such as for one port non-zero power (NZP) CSI-RS resources and SSBs, for two port NZP CSI-RS resources, for aperiodic CSI-RS resources, etc.). Such capability information may be provided as combined capability information for both L1 neighbor and serving cell measurements, or may be provided as L1 neighbor cell measurement specific capability information, according to various embodiments.

The serving cell may provide configuration information to the UE (504), according to some embodiments. The configuration information may indicate a measurement configuration for non-serving cell L1 inter-frequency measurements. For example, the configuration information may indicate periodicity, index, and/or time and/or frequency resources of reference signals transmitted by one or more neighbor cells. Additional and/or different characteristics of the reference signals and/or measurements may be indicated. In some embodiments, the configuration information may be based (e.g., in part) on capability information of the UE. In some embodiments, the configuration information may include measurement configuration for the serving cell and/or higher layer (e.g., L3, etc.) measurements for non-serving cells. Among various possibilities, the configuration information may be useable to assist the UE in detecting, measuring and reporting the non-serving cell(s). The configuration information may describe various types of reference signals (RS), such as SSB, CSI-RS, etc. Various examples of configuration information for non-serving cell L1 measurements are provided below.

The UE may be configured with L1-RSRP and/or L1-SINR on SSB and/or CSI-RS on non-serving cells. For example, L1 and CSI measurements (e.g., of a serving cell only) may be configured via a CSI-ReportConfig information element (IE). In order to support L1 measurement and reporting on the non-serving cell(s), a similar report configuration for the non-serving cell(s) may be configured. For example, a new CSI-ReportConfig-nonServing IE may be added to standards for this purpose. Alternatively, the CSI-ReportConfig IE may be extended/enhanced to include non-serving cell(s). For example, the CSI-ReportConfig IE and/or CSI-ReportConfig-nonServing IE may include relevant fields for measurement report(s) about non-serving cell(s) and/or RS (e.g., SSB) configuration for non-serving cell(s), as further explained below.

In some embodiments, in addition to the relevant fields required for reporting measurements on the non-serving cell(s), the configuration information also indicate configuration of the reference signals of the non-serving cell(s). For example, the configuration information may indicate the RS (e.g., SSB and/or CSI-RS, etc.) configuration. Further, the configuration including the RS periodicity and/or index of the neighbor cell(s) may allow the UE to avoid cell detection and measurement time. It will be appreciated that "cell detection and measurement time" in this instance may refer to the amount of time that the UE would spend on (e.g., blind) detection, decoding, and related measurements to identify RS of the non-serving cell. Such cell detection and measurement time may be reduced or eliminated based on configuration information indicating the time/frequency location(s) of the RS, thus avoiding the need for blind detection and decoding. Further, such configuration may promote the UE measuring the non-serving cell(s) outside of times scheduled for measurement of the serving cell (e.g., according to SSB measurement timing configuration (SMTC)). As noted above, SMTC may describe times for L3 measurement of SSB of the neighbor cell(s). However, for L1 inter-frequency measurement of the neighbor cell(s) (e.g., using SSB), the UE may perform measurements outside of the SMTC time/frequency resources. In other words, such configuration may facilitate the UE utilizing additional transmissions (e.g., potentially every transmission during a measurement period) of SSB and/or other RS by the non-serving cell(s).

FIG. 6 illustrates an example of configuration information using a possible variation of SMTC configuration, e.g., with enhancements for non-serving cell(s), according to some embodiments. As shown, a separate SMTC configuration may be provided in an IE (e.g., which may be called SSB-MTC-L1 r17, for instance) for any or all non-serving cells configured for L1 measurements. Thus, a dedicated configuration for L1 measurements on non-serving cells may be provided, on a per-serving cell basis. This approach may allow the network flexibility to configure non-serving cell measurement(s) separately from other SMTC (e.g., of the serving cell). The SMTC configuration may provide the UE configuration to detect, measure, and report the L1-RSRP (and/or SINR or other measurement(s)) on RS (e.g., SSBs) from any non-serving cell(s).

Another aspect of configuration information may include a new or modified scaling factor. A carrier-specific scaling factor (CSSF) may be described in TS 38.133 clause 9.1.5. The CSSF may be used to scale measurement timing parameters such as measurement delay requirements. CSSF may include $CSSF_{outside\_gap}$ which may be discussed in 9.1.5.1 and $CSSF_{within\_gap}$ which may be discussed in 9.1.5.2. For many cases, inter-frequency L1 measurement may be done within a measurement gap. Thus, $CSSF_{within\_gap}$ may apply to inter-frequency L1 measurements of neighbor cells. For example, a measurement period for inter-frequency L1 measurement on a first neighbor cell may be based on CSSF which may be based on a total number of inter-frequency layers configured for L1 measurement (e.g., of the first neighbor cell) during a measurement gap.

In some embodiments, aspects of $CSSF_{within\_gap}$ may be modified as described herein, e.g., to accommodate or support inter-frequency L1 measurements of neighbor cells. For example, the discussion of CSSF in existing sections from 9.1.5.2.1 to 9.1.5.2.5 (and/or similar documents) may be updated as discussed below.

In particular, a parameter ($M_{tot}$) indicating the number of layers which are candidates to be measured within a gap may be adjusted to include the number of L1 measurements. For example, $M_{tot}$ may be a parameter used to calculate $CSSF_{within\_gap}$ as described in: 9.1.5.2.1 EN-DC mode: carrier-specific scaling factor for SSB and CSI-RS-based L3 measurements performed within gaps. Specifically, $M_{tot,i,j}$ may be calculated as a sum: $M_{intra,i,j} + M_{inter,i,j}$. The parameter i may refer to measurement object i. The parameter j may refer to a particular gap j. $M_{intra,i,j}$ may refer to the number of intra-frequency measurement objects, including both SSB and CSI-RS based, which are candidates to be measured in gap j where the measurement object i is also a candidate. Similarly, $M_{inter,i,j}$ may refer to a number of NR inter-frequency layers including both SSB and CSI-RS based NR inter-RAT frequency layer, configured by E-UTRA PCell, EUTRA inter-frequency measurement objects configured by E-UTRA PCell, or UTRA inter-RAT measurement objects configured by E-UTRA PCell which are candidates to be measured in gap j where the measurement object i is also a candidate. The number of layers for measurement may refer to a number of frequency layers for measurement. Thus, the number of layers is distinct from the layer of the measurement (e.g., L1, L3, etc.). $M_{inter,i,j}$ may only refer to higher layer measurements (e.g., L3) measurements and may not include L1 measurements, according to some embodiments. Thus, a new term may be added to the calculation of $M_{tot,i,j}$ to represent the number of (e.g., frequency) layers for L1 measurement (e.g., for inter-frequency measurement of neighbor cells. In some embodiments, such a new term may be described as $M_{inter,i,j\_L1}$. $M_{inter,i,j\_L1}$ may describe a total number of inter-frequency layers which are configured with L1-RSRP and/or L1-SINR to be measured in gap j where the measurement object i is also a candidate. $M_{inter,i,j\_L1}$ may describe the number of frequency layers for such L1 inter-frequency measurements of the neighbor cell(s). Thus, $M_{tot,i,j}$ may be calculated as $M_{intra,i,j} + M_{inter,i,j} + M_{inter,i,j\_L1}$. It will be appreciated that the specific identifier $M_{inter,i,j\_L1}$ and description provided is an example, and a different identifier and/or description may be used as desired.

A specific example of the potential revised text of 9.1.5.2.1 may be as follows: The scaling value $CSSF_{within\_gap,i}$ below has been derived without considering GSM inter-RAT carriers.

When one or more measurement objects are monitored within measurement gaps, the carrier specific scaling factor for a target measurement object with index i is designated as $CSSF_{within\_gap,i}$ and is derived as described in this clause.

If measurement object i refers to an RSTD measurement with periodicity Tprs>160 ms or with periodicity Tprs=160 ms but prs-MutingInfo-r9 is configured, $CSSF_{within\_gap,i}=1$. Otherwise, the $CSSF_{within\_gap,i}$ for other measurement objects (including RSTD measurement with periodicity Tprs=160 ms) participate in the gap competition are derived as below.

For each measurement gap j not used for an RSTD measurement with periodicity Tprs>160 ms or with periodicity Tprs=160 ms but prs-MutingInfo-r9 is configured within an arbitrary 160 ms period, count the total number of intra-frequency measurement objects and inter-frequency/inter-RAT measurement objects which are candidates to be measured within the gap j.

An NR measurement object with SSB measurement configured is a candidate to be measured in a gap if its SMTC duration is fully covered by the MGL excluding RF switching time. For intra-frequency NR carriers, if the higher layer in TS 38.331 [2] signaling of smtc2 is configured, the assumed periodicity of SMTC occasions corresponds to the value of higher layer parameter smtc2; otherwise the assumed periodicity of SMTC occasions corresponds to the value of higher layer parameter smtc1.

An NR measurement object with CSI-RS measurement configured is a candidate to be measured in a gap if the window confining all CSI-RS resources are fully covered by the MGL excluding RF switching time. —

An inter-RAT UTRA measurement object configured by E-UTRA PCell [15] is a candidate to be measured in all measurement gaps.

An inter-frequency E-UTRA measurement object configured by E-UTRA PCell [15] is a candidate to be measured in all measurement gaps.

For UEs which support and are configured with per FR gaps, the counting is done on a per FR basis, and for UEs which are configured with per UE gaps the counting is done on a per UE basis.

$M_{intra,i,j}$: Number of intra-frequency measurement objects, including both SSB and CSI-RS based, which are candidates to be measured in gap j where the measurement object i is also a candidate. Otherwise $M_{intra,i,j}$ equals 0.

$M_{inter,i,j}$: Number of NR inter-frequency layers including both SSB and CSI-RS based, NR inter-RAT frequency layer, configured by E-UTRA PCell, EUTRA inter-frequency measurement objects configured by E-UTRA PCell, or UTRA inter-RAT measurement objects configured by E-UTRA PCell which are candidates to be measured in gap j where the measurement object i is also a candidate. Otherwise $M_{inter,i,j}$ equals 0.

$M_{inter,i,j\_L1}$: Total number of inter-frequency layers which are configured with L1-RSRP and/or L1-SINR to be measured in gap j where the measurement object i is also a candidate. Otherwise $M_{inter,i,j\_L1}$ equals 0.

$M_{tot,i,j} = M_{intra,i,j} + M_{inter,i,j} + M_{inter,i,j\_L1}$: Total number of intra-frequency, inter-frequency and inter-RAT frequency layers which are candidates to be measured in gap j where the measurement object i is also a candidate. Otherwise Mtot,i,j equals 0.

It will be appreciated that similar additions and revisions may be applied in other parts of TS 38.133 and/or other documents. For example, similar additions may be introduced in TS 38.133 sections 9.1.5.2.2~9.1.5.2.4 which may relate to SA mode, NE-DC and NR-DC, respectively.

As another possible example of configuration information, such information may relate to calculation of a measurement period (e.g., in ways other than or in addition to via calculation of CSSF). For example, new sections may be added to the specification (e.g., TS 38.133 and/or other documents) to describe L1-RSRP and/or L1-SINR measurements. For example, such new sections may describe a measurement period (e.g., for inter-frequency L1 measurements of the neighbor cell(s)) as a function of RS periodicity of the neighbor cell(s). As one possibility, a measurement period may be based on the larger of MGRP and/or the RS periodicity. Potential changes for L1-RSRP and L1-SINR inter-frequency measurements of neighbor cells are described below. L1-RSRP is described first, then L1-SINR follows.

Existing L1-RSRP measurement requirements for the serving cell may be specified in TS 38.133 clause 9.5. However, the current description in TS 38.133 may not cover inter-frequency L1 measurements of neighbor cells. Thus, in order to support inter-frequency L1-RSRP measurement of neighbor cells, new measurement description and/or requirements may be added. For example, a new section (or sections) may be introduced to describe such measurements. The new section may be added to the end of 9.5, among various possibilities. For example, it could be added as, e.g.: 9.5.x inter-frequency L1-RSRP measurement. Subsections for SSB and/or CSI-RS based measurements may be included, e.g.: 9.5.x.1 SSB based inter-frequency L1-RSRP measurement and 9.5.x.2 CSI-RS based inter-frequency L1-RSRP measurement. It will be appreciated that the numbering and titles provided herein are examples, and that such section(s) may be added in various other locations of 38.133 or other documents.

Further detail with respect to L1-RSRP measurements may be provided in FIGS. 7-10 and discussed below with respect to those figures.

Note that measurement reporting requirements defined in 9.5.3 may apply for inter-frequency L1-RSRP measurement as well. In some embodiments, 9.5.3 may not be updated. In some embodiments, changes to 9.5.3 may be made. Note that 9.5.4 may include description of L1-RSRP measurements for the serving cell.

Existing L1-SINR measurement requirements for the serving cell may be specified in TS 38.133 clause 9.8. However, the current description in TS 38.133 may not cover inter-frequency L1 measurements of neighbor cells. Thus, in order to support inter-frequency L1-SINR measurement of neighbor cells, new measurement description and/or requirements may be added. For example, a new section (or sections) may be introduced to describe such measurements. The new section may be added to the end of 9.8, among various possibilities. For example, it could be added as, e.g.: 9.8.x inter-frequency L1-SINR measurement. Subsections for SSB and/or CSI-RS based measurements may be included, e.g.: 9.8.x.1 L1-SINR reporting with CSI-RS based CMR and no dedicated IMR configured, 9.8.x.2 L1-SINR reporting with SSB based CMR and dedicated IMR configured, and 9.8.x.3 L1-SINR reporting with CSI-RS based CMR and dedicated IMR configured.

Further detail with respect to L1-SINR measurements may be provided in FIGS. 11-16 and discussed below with respect to those figures.

Note that measurement reporting requirements defined in 9.8.3 may apply for inter-frequency L1-SINR measurement as well. In some embodiments, 9.8.3 may not be updated. In some embodiments, changes to 9.8.3 may be made. Note that 9.8.4 may include description of L1-SINR measurements for the serving cell.

In some embodiments, the configuration information may include configuration for additional or different related and/or unrelated aspects of communication between the UE and the network (e.g., serving cell and/or neighbor cells).

For example, the configuration may specify one or more frequencies, frequency bands, frequency ranges, component carriers, etc. for which the UE is configured to perform measurements. As one possibility, the configuration information may indicate neighbor cell L1 inter-frequency measurement configuration for frequency range 1 (FR1) and/or FR2 (e.g., as described in 3GPP specifications such as TS 38.104).

As another example, the configuration information may provide discontinuous reception (DRX) cycle information. For example, the configuration information may include a DRX cycle length and/or information about how/when DRX is applied.

Different configuration information may be provided for different types of RS scheduling. For example, the configuration information may be different for persistent, semi-persistent, and/or aperiodic RS (e.g., CSI-RS and/or SSB).

The UE may determine one or more measurement configuration(s) or measurement configuration parameter(s) for neighbor cell L1 measurement (506), according to some embodiments. The UE may determine the configuration(s) or parameter(s) based on the configuration information and/or other factors.

For any individual neighbor cell or group of cells, the UE may determine: what L1 inter-frequency measurement(s) to perform (e.g., SINR or RSRP, etc.); when to perform the measurements (e.g., a measurement period); what RS (e.g., CSI-RS and/or SSB, etc.) to use for the measurement; what frequency, frequencies, frequency range(s), etc. to use; when and how to report the measurement (e.g., how often), etc. It will be appreciated that different measurement periods (and/ or other characteristics) may be determined for different measurement types, according to some embodiments. For example, one measurement period may be determined for L1-RSRP and a different measurement period may be determined for L1-SINR.

In some embodiments, in order to determine a measurement period, the UE may determine one or more related quantities (e.g., parameters for calculating the measurement period). For example, the UE may determine one or more CSSF, one or more reporting period (e.g., $T_{report}$), one or more RS period (e.g., $T_{SSB}$, $T_{CSI-RS}$, etc.), a DRX cycle time (e.g., $T_{DRX}$), a sharing factor (e.g., P), MGRP, and/or other factors (e.g., M, N, etc. as discussed in 9.5.4 and/or 9.8.4 of TS 38.133).

In some embodiments, the UE may determine characteristics of the RS of the neighbor cell(s), e.g., based on the configuration information. The UE may determine such characteristics for one or more individual cells, e.g., different neighbor cells may have different characteristics and the UE may determine the individual characteristics of any number of neighbor cells (e.g., as indicated in the configuration information). The UE may determine characteristics of various types of RS (e.g., CSI-RS, SSB, etc.) for any neighbor cell(s). The UE may determine periodicity and/or time and/or frequency resources for various characteristics of the RS. Similarly, the UE may determine an index used for the RS. It will be appreciated that, in embodiments where characteristics of the RS of the neighbor cell(s) are indicated in the configuration information, the UE may determine such characteristics without performing a search for the neighbor cell RS. For example, based on characteristics of the RS included in the configuration information (e.g., in a report config message, among various possibilities), the UE may determine the time/frequency location(s) of the RS and may avoid searching for the RS. The UE may determine time and/or frequency resources for measurements of various types for various neighbor cells. For example, the UE may determine first time/frequency resources for L1-RSRP measurement of a first neighbor cell, second time/frequency resources for L1-SINR measurement of the first neighbor cell, third time/frequency resources for L1-RSRP measurement of a second neighbor cell, fourth time/frequency resources for L1-SINR measurement of the second neighbor cell, etc. Any of the sets of time/frequency resources may overlap in the time and/or frequency domains or the sets may be disjoint.

Such characteristics may be determined for one or more frequency band (e.g., FR1, FR2, etc.) for any cell(s). Similarly, such characteristics may be determined according to the operation of the UE, such as a DRX cycle of the UE. Further, such characteristics may be determined for persistent, semi-persistent, and/or aperiodic RS (e.g., CSI-RS and/or SSB). In other words, different RS scheduling may have different characteristics.

Thus, at different times, the UE may determine different measurement configurations. For example, at a first time the UE may operate according to a first DRX cycle (e.g., including operating without DRX, e.g., non-DRX) and/or a first frequency band. At a second time, the UE may operate according to a second DRX cycle and/or a second frequency band. The UE may determine different inter-frequency L1 measurement parameters for neighbor cells based on the different DRX and/or frequency band, e.g., in combination with the received configuration information. In other words, in response to detecting a change in DRX and/or frequency band, the UE may determine a change in measurement parameters.

In some embodiments, the UE may determine an SMTC configuration for one or more non-serving cells.

The neighbor cell(s) may transmit RS (508), according to some embodiments. The RS may be transmitted according to a configuration consistent with the configuration information (e.g., discussed in 504). For example, the RS may be transmitted with periodicity and/or on time/frequency resources consistent with the configuration information. The RS may use an index (e.g., or indices) consistent with the configuration information. The UE may receive the RS from the one or more neighbor cell(s). The RS may include CSI-RS and/or SSB, among various possibilities. The RS may be persistent, semi-persistent, and/or aperiodic.

The UE may perform measurement(s) of the RS received from the neighbor cell(s) (510), according to some embodiments. The UE may perform the measurement(s) according to a configuration consistent with the configuration information (e.g., discussed in 504 and 506). For example, the UE may periodically perform the measurement(s) according to the measurement period(s) determined in 506, among various possibilities. The measurement(s) may be or include L1 inter-frequency measurements. For example, the UE may measure L1-RSRP and/or L1-SINR of CSI-RS and/or SSB transmitted by the neighbor cell(s).

In some embodiments, at least some of the measurements may be performed at times not scheduled according to an SMTC period (e.g., $T_{SMTCperiod}$) associated with the serving cell.

In some embodiments, the measurements may be performed according to an SMTC period or SMTC configuration of the non-serving cell(s).

In some embodiments, event-based measurements may be performed.

The UE may report the measurement(s) or information based on the measurement(s) to the serving cell (512), according to some embodiments. For example, the UE may transmit a report of the measurement value(s) to the serving cell periodically, e.g., according to reporting period(s) and/ or SMTC configuration for L1 inter-frequency measurement(s) on the non-serving cell(s) determined in 506.

In some embodiments, event-based measurement reports may be provided.

FIGS. 7—16—Example Measurement Period Tables

FIGS. 7-16 illustrate various examples of calculating measurement period and/or related parameters (e.g., as discussed above regarding 506).

As mentioned above, a new portion of the specification (e.g., possibly added as section 9.5.x.1 of TS 38.133) may describe SSB based inter-frequency L1-RSRP measurement. Such a section could state that the UE should be capable of performing inter-frequency L1-RSRP measurements based on the configured SSB resource for L1-RSRP computation, and the UE physical layer should be capable of reporting L1-RSRP measured over a measurement period. The measurement period may be labeled $T_{Inter-L1-RSRP\_Measurement\_Period\_SSB}$, among various possibilities. Example tables for determining the value of $T_{Inter-L1-RSRP\_Measurement\_Period\_SSB}$ are illustrated in FIG. 7 for FR1 and FIG. 8 for FR2, according to some embodiments. For FIGS. 7 and 8, the following parameters may be used:

M=1 if higher layer parameter timeRestrictionForChannelMeasurement is configured, and M=3 otherwise.

N=8.

P may be a scaling factor due to overlapping of L1 measurement, SMTC for L3 measurement, and measurement gap (MG). The P value may be different for different scenarios, e.g., the P value may depend on the level of overlapping between the L1 measurement resource (e.g., for L1 inter-frequency RSRP based on SSB), SMTC (e.g., for L3 measurement of the neighbor cell) and measurement gap. In other words, P may depend on the amount of overlap in the time domain between these three events. For example, P may be 1 if there is no overlap between an L1 measurement and either the SMTC or the measurement gap. P may be greater than 1 if there is partial overlap between L1 measurements and SMTC and/or measurement gap. It will be appreciated that different measurement gaps may be configured for intra-frequency, inter-frequency, and/or inter-RAT measurements. In some embodiments, a measurement gap specific for L1 inter-frequency measurements of neighbor cells may be used for calculation of P. In some embodiments, a measurement gap for inter-frequency, intra-frequency, and/or inter-RAT (e.g., L1 and/or L3) measurements of the serving cell and/or neighbor cell(s) may be used for calculation of P. MGRP may be the measurement gap repetition period of the configured MG pattern. $CSSF_{inter}$ may be the scaling factor for measurement on multiple layers. Note that $CSSF_{inter}$ may be determined according to methods discussed herein (e.g., incorporating a number of layers for inter-frequency L1 measurements of neighbor cells).

With regard to FIGS. 7 and 8, $T_{DRX}$ may be the applicable/current DRX cycle length (e.g., of the UE on a relevant frequency band). $T_{Report}$ may be a configured periodicity for reporting. In some embodiments, K=1 when $T_{SSB} \leq 40$ ms and highSpeedMeasFlag-r16 are configured; otherwise K may equal 1.5, among various possibilities. Further, in the case of FIGS. 7 and 8 (and more generally to any/all of FIGS. 7-16), it will be appreciated that any or all of the parameters may be specific to the neighbor cell(s). For example, $T_{SSB}$ (as in the figures of this application) may be for the neighbor cell, according to some embodiments. Such a parameter could be expressed as $T_{SSB}$. $T_{SSB}$ may be "ssb-periodicityNeighborCellX" indicating that $T_{SSB}$ is the periodicity of the SSB-Index configured for L1-RSRP measurement of a particular neighbor cell X, among various possibilities. Similarly, $T_{Report}$ may refer to a reporting period for neighbor cell L1-RSRP measurement. Thus, the parameters illustrated in FIGS. 7-16 may have different values than related parameters in TS 38.133 or other specifications. For example, $T_{report}$ in the Figures herein may have a different value than $T_{Report}$ as referenced in section 9.5.4 of TS 38.133.

As mentioned above, a new portion of the specification (e.g., possibly added as section 9.5.x.2 of TS 38.133) may describe CSI-RS based inter-frequency L1-RSRP measurement. Such a section could state that the UE should be capable of performing L1-RSRP measurements based on the configured CSI-RS resource for L1-RSRP computation, and the UE physical layer should be capable of reporting L1-RSRP measured over a measurement period. The measurement period could be labeled as $T_{Inter-L1-RSRP\_Measurement\_Period\_CSI-RS}$, among various possibilities. Example tables for determining the value of $T_{Inter-L1-RSRP\_Measurement\_Period\_CSI-RS}$ are illustrated in FIG. 9 for FR1 and in FIG. 10 for FR2. For these Figures, parameters M and N may be similar to the scaling factors which are described in existing TS 38.133 clause 9.5.4.2.

For FIGS. 9 and 10, P may be a scaling factor due to overlapping of L1 measurement, SMTC for L3 measurement and measurement gap. P may be calculated in an analogous manner as described for FIGS. 7 and 8. The P value may be different for different scenarios, e.g., the P value may depend on the level of overlapping between the L1 measurement resource (e.g., for L1 inter-frequency RSRP based on CSI-RS), SMTC (e.g., for L3 measurement of the neighbor cell) and measurement gap. In other words, P may depend on the amount of overlap in the time domain between these three events.

MGRP may be the measurement gap repetition period of the configured MG pattern. For FIGS. 9 and 10, MGRP may be specific to inter-frequency L1-RSRP measurement of the neighbor cell(s).

$CSSF_{inter}$ may be the scaling factor for measurement on multiple layers. For FIGS. 9 and 10, $CSSF_{inter}$ may be specific to inter-frequency L1-RSRP measurement of the neighbor cell(s). $CSSF_{inter}$ may be determined according to methods discussed herein (e.g., incorporating a number of layers for inter-frequency L1 measurements of neighbor cells).

With regard to FIGS. 9 and 10, it will be appreciated that:

$T_{CSI-RS}$ may be the periodicity of CSI-RS configured for L1-RSRP measurement. $T_{DRX}$ may be the DRX cycle length. $T_{Report}$ may be configured periodicity for reporting.

The tables may be applicable provided that the CSI-RS resource configured for L1-RSRP measurement is transmitted with Density=3, according to some embodiments.

K may be set as K=1 when $T_{CSI-RS} \leq 40$ ms and highSpeedMeasFlag-r16 are configured; otherwise, K=1.5.

Moreover, in the case of FIGS. 9 and 10 (and more generally to any/all of FIGS. 7-16), it will be appreciated that any or all of the parameters may be specific to the neighbor cell(s). For example, $T_{CSI-RS}$ may be for the neighbor cell. Such a parameter could be expressed as $T_{CSI-RS}$=SSI-CRS-periodicityNeighborCellX, which may indicate the periodicity of the CSI-RS-Index configured for L1-RSRP measurement of a particular neighbor cell X, among various possibilities. Similarly, $T_{Report}$ may refer to a reporting period for neighbor cell L1-RSRP measurement, and may have a different value than $T_{Report}$ as referenced in section 9.5.4 of TS 38.133.

As mentioned above, a new portion of the specification (e.g., possibly added as section 9.8.x.1 of TS 38.133) may describe CSI-RS based inter-frequency L1-SINR measurement when dedicated IMR is not configured. Such a section may state that the UE should be capable of performing L1-SINR measurements with the CSI-RS resource configured as CMR and no dedicated resource configured as IMR for L1-SINR computation, and the UE physical layer should be capable of reporting L1-SINR measured over a measurement period. The measurement period may be labeled as $T_{Inter-L1-SINR\_Measurement\_Period\_CSI-RS\_CMR\_Only}$, among various possibilities. Example tables for determining the value of $T_{Inter-L1-SINR\_Measurement\_Period\_CSI-RS\_CMR\_Only}$ are illustrated in FIG. 11 for FR1 and in FIG. 12 for FR2.

In some embodiments, for periodic and semi-persistent CSI-RS resources configured as a channel measurement resource (CMR), the parameter M may be set to 1 (e.g., M=1) if a higher layer parameter (e.g., timeRestrictionForChannelMeasurement) is configured, and M=3 otherwise. For aperiodic CSI-RS resources as CMR, M=1.

As described above regarding, P may be a scaling factor due to overlapping of L1 measurement, SMTC for L3 measurement, and measurement gap with respect to FIGS. 11 and 12. MGRP may be a measurement gap repetition period of the configured MG pattern. $CSSF_{inter}$ may be a scaling factor for measurement on multiple layers. Any or all of these parameters may be set and/or determined specifically for one or more neighbor cell(s). For example, $CSSF_{inter}$ may be determined according to methods discussed herein (e.g., incorporating a number of layers for inter-frequency L1 measurements of neighbor cells).

Similarly, $T_{CSI-RS}$ may be a periodicity of CSI-RS configured for L1-SINR measurement, e.g., for inter-frequency neighbor cell measurement. $T_{DRX}$ may be a DRX cycle length. $T_{Report}$ may be a configured periodicity for reporting, e.g., for inter-frequency neighbor cell measurement.

In some embodiments, FIGS. 11 and 12 may be applicable provided that the CSI-RS resource configured for L1-SINR measurement is transmitted with Density=3.

As mentioned above, a new portion of the specification (e.g., possibly added as section 9.8.x.2 of TS 38.133) may describe SSB based inter-frequency L1-SINR measurement when dedicated IMR is configured. Such a section may state that the UE should be capable of performing L1-SINR measurements with the SSB configured as CMR and dedicated resource configured as IMR for L1-SINR computation, in which the NZP-CSI-RS or CSI-IM resource configured as dedicated IMR may be 1-to-1 mapped to SSB configured as CMR, with the same periodicity. The UE physical layer may be capable of reporting L1-SINR measured over the measurement period. Such a measurement period may be referred to as $T_{Inter-L1-SINR\_Measurement\_Period\_SSB\_CMR\_IMR}$, among various possibilities. In some embodiments, such a clause may not applicable if NZP-CSI-RS or CSI-IM resource configured as dedicated IMR is scheduled with different periodicity as SSB configured as CMR.

Example tables for determining the value of $T_{Inter-L1-SINR\_Measurement\_Period\_SSB\_CMR\_IMR}$ are illustrated in FIG. 13 for FR1 and in FIG. 14 for FR2, according to some embodiments.

In some embodiments, for FIGS. 13 and 14, for periodic or semi-persistent NZP CSI-RS or CSI-IM resource as dedicated IMR, M=1 if either or both of the higher layer parameters timeRestrictionForChannelMeasurements and/or timeRestrictionForInterferenceMeasurements are configured, and M=3 otherwise. As described above, P may be a scaling factor due to overlapping of L1 measurement, SMTC for L3 measurement and measurement gap. MGRP may be the measurement gap repetition period of the configured MG pattern. $CSSF_{inter}$ may be the scaling factor for measurement on multiple layers. $CSSF_{inter}$ may be determined according to methods discussed herein (e.g., incorporating a number of layers for inter-frequency L1 measurements of neighbor cells).

$T_{SSB}$ may refer to a periodicity of the SSB-Index configured for L1-SINR channel measurement, e.g., for inter-frequency measurement of the neighbor cell(s). $T_{DRX}$ may be a DRX cycle length. $T_{Report}$ may be a configured periodicity for reporting, e.g., for inter-frequency neighbor cell measurement.

In some embodiments, the CSI-RS resource configured for interference measurement may be 1-to-1 mapped to SSB configured for channel measurement, with the same periodicity. In some embodiments, FIGS. 13 and 14 may apply to such 1-to-1 mapping of CSI-RS and SSB.

As mentioned above, a new portion of the specification (e.g., possibly added as section 9.8.x.3 of TS 38.133) may describe CSI-RS based inter-frequency L1-SINR measurement when dedicated IMR is configured. Such a section may state that the UE should be capable of performing L1-SINR measurements with the CSI-RS resource configured as CMR and dedicated resource configured as IMR for L1-SINR computation, in which the NZP-CSI-RS or CSI interference measurement (CSI-IM) resource may be configured as dedicated IMR shall be 1-to-1 mapped to CSI-RS resource configured as CMR, with the same periodicity. The UE physical layer should be capable of reporting L1-SINR measured over a measurement period. The measurement period may be labeled as $T_{L1-SINR\_Measurement\_Period\_CSI-RS\_CMR\_IMR}$, among various possibilities. In some embodiments, such a clause may not be applicable if NZP-CSI-RS or CSI-IM resource configured as dedicated IMR is scheduled with different periodicity as CSI-RS resource configured as CMR. In some embodiments, such a clause may be applicable if the CSI-RS resource configured for L1-SINR measurement is transmitted with Density=3. In some embodiments, such a clause may be applicable provided that the CSI-RS resource configured for interference measurement is 1-to-1 mapped to CSI-RS configured for channel measurement, with the same periodicity.

In some embodiments, CSI-IM may be CSI resources configured for interference measurement. CSI-IM may not actually be transmitted, but a pattern may be specified in the resource element grid which the UE can use for interference measurements. In other words, the UE may not transmit and/or receive using the CSI-IM resources and may use the pattern of CSI-IM resources to measure interference.

Example tables for determining the value of $T_{L1-SINR\_Measurement\_Period\_CSI-RS\_CMR\_IMR}$ are illustrated in FIG. 15 for FR1 and in FIG. 16 for FR2, according to some embodiments.

In some embodiments, for FIGS. 15 and 16, M=1 may be applied if:
aperiodic NZP-CSI-RS is configured as CMR or dedicated IMR,
aperiodic CSI-IMR is configured as dedicated IMR,
periodic and semi-persistent NZP-CSI-RS is configured as CMR or dedicated IMR and the higher layer parameters timeRestrictionForChannelMeasurement and/or timeRestrictionForInterferenceMeasurements are configured, and/or
periodic and semi-persistent CSI-IM is configured as dedicated IMR and the higher layer parameters timeRestrictionForChannelMeasurement and/or timeRestrictionForInterferenceMeasurements are configured;

In some embodiments, M=3 may be applied otherwise, e.g., if none of the conditions for M=1 apply.

As described above, P may be a scaling factor due to overlapping of L1 measurement, SMTC for L3 measurement, and measurement gap with respect to FIGS. 15 and 16. MGRP may be a measurement gap repetition period of the configured MG pattern. $CSSF_{inter}$ may be a scaling factor for measurement on multiple layers. $CSSF_{inter}$ may be determined according to methods discussed herein (e.g., incorporating a number of layers for inter-frequency L1 measurements of neighbor cells). Any or all of these parameters may be set and/or determined specifically for one or more neighbor cell(s).

Similarly, $T_{CSI-RS}$ may be a periodicity of CSI-RS configured for L1-SINR measurement, e.g., for inter-frequency neighbor cell measurement. $T_{DRX}$ may be a DRX cycle length. $T_{Report}$ may be a configured periodicity for reporting, e.g., for inter-frequency neighbor cell measurement.

It will be appreciated that a UE may use the tables illustrated in any of FIGS. 7-16 to determine a measurement period (e.g., in 506). For example, from the configuration information provided to the UE (e.g., in 504), the UE may determine one or more of the parameter values used in one or more of the tables (e.g., FIGS. 7-16). The UE may use the formulas illustrated in the relevant table(s) to determine a corresponding measurement period to apply. Thus, the UE may use the determined measurement period(s) to perform inter-frequency L1 neighbor cell measurements (e.g., in 510). The UE may report the measurements according to the corresponding reporting period(s) (e.g., in 512).

ADDITIONAL INFORMATION

The following additional information describes further aspects that might be used in conjunction with the method of FIG. 5 if desired. It should be noted, however, that the exemplary details described are not intended to be limiting to the disclosure as a whole: numerous variations and alternatives to the details provided herein below are possible and should be considered within the scope of the disclosure.

In 3GPP Releases 15 and 16, L1 measurements on serving cells, including L1-RSRP and L1-SINR measurements, may be supported. Corresponding UE L1 measurement capability and measurement restriction may currently be specified in 3GPP TS 38.306 v.16.4.0 and 38.133 v.16.7.0, respectively. For example, UE scheduling availability in conjunction with such measurements (e.g., including whether/when a UE can be scheduled for data communications before, during, and after L1 measurements on a serving cell are performed) may currently be specified in 3GPP TS 38.133 v.16.7.0.

L1 measurements on neighbor cells are not supported in 3GPP Releases 15 and 16, but may be supported in 3GPP Release 17.

In various embodiments, the serving cell and one or more neighbor cells may be provided by the same or different base station(s) or by the same or different TRP(s). For example, a first TRP may provide a serving cell and a second TRP may provide a neighbor cell. The first TRP may be controlled by a first base station. The second TRP may be controlled by a second base station or by the first base station.

In some embodiments, the methods discussed herein may apply to measurements of multiple TRPs of the same cell.

In some embodiments, the serving cell and one or more neighbor cells may be provided by a same network, e.g., a same public lands mobile network (PLMN).

In various embodiments, the serving cell and one or more neighbor cells may operate according to the same or different RAT(s). For example, a serving cell may operate according to NR and a neighbor cell may operate according to LTE, or vice versa.

In the following further exemplary embodiments are provided.

One set of embodiments may include an apparatus, comprising: a processor configured to cause a user equipment device (UE) to: establish a wireless link with a serving cell; receive, from the serving cell, configuration information; determine, based on the configuration information, a first measurement period for inter-frequency layer 1 (L1) measurement on a first neighbor cell; receive, from the first neighbor cell, at least one reference signal; perform at least one L1 measurement of the at least one reference signal according to the first measurement period for inter-frequency L1 measurement on the first neighbor cell; and transmit, to the serving cell, a report of the at least one L1 measurement.

In some embodiments, the processor is further configured to cause the UE to: determine, based on the configuration information, a second measurement period for inter-frequency L1 measurement on a second neighbor cell different from the first measurement period for inter-frequency L1 measurement on the first neighbor cell; receive, from the second neighbor cell, a second at least one reference signal; and perform a second L1 measurement of the second at least one reference signal according to the second measurement period for inter-frequency L1 measurement on the second neighbor cell, wherein the report of the at least one L1 measurement includes a report of the second L1 measurement.

In some embodiments, the first measurement period for inter-frequency L1 measurement on the first neighbor cell is based on a total number of inter-frequency layers configured for L1 measurement during a measurement gap.

In some embodiments, the at least one L1 measurement includes one or more of: an L1 reference signal received power (RSRP) measurement; or an L1 signal to interference and noise ratio (SINR) measurement.

In some embodiments, the first measurement period for inter-frequency L1 measurement on the first neighbor cell is based on a synchronization signal block (SSB) periodicity of the first neighbor cell indicated by the configuration information.

In some embodiments, the first measurement period for inter-frequency L1 measurement on the first neighbor cell is based on the larger of: a measurement gap repetition period (MGRP); or a neighbor cell reference signal periodicity, wherein the neighbor cell reference signal periodicity indicated by the configuration information.

In some embodiments, the configuration information indicates a channel state information (CSI) reference signal (CSI-RS) periodicity of the first neighbor cell, wherein the first measurement period for inter-frequency L1 measurement on the first neighbor cell is based on the CSI-RS periodicity of the first neighbor cell.

In a second set of embodiments, a user equipment device (UE), may comprise: an antenna; a radio operably coupled to the antenna; and a processor operably coupled to the radio and configured to cause the UE to: establish a wireless link with a serving transmission and reception point (TRP); receive, from the serving TRP: first configuration information for layer 1 (L1) measurement of the serving TRP; and second configuration information for L1 measurement of a non-serving TRP, different from the first configuration information; receive, from the non-serving TRP, reference signals; based on the second configuration information: perform at least one L1 measurement of the reference signals; and transmit, to the serving TRP, a report of the at least one L1 measurement.

In some embodiments, the second configuration information includes an indication of a periodicity of the reference signals, wherein the processor is further configured to cause the UE to determine a timing of the reference signals based on the periodicity.

In some embodiments, by determining the timing of the reference signals, a period of time associated with detection of the reference signals is avoided.

In some embodiments, the second configuration information includes an indication of an index of the reference signals, wherein the processor is further configured to cause the UE to determine a time and/or frequency location of the reference signals based on the index of the reference signals.

In some embodiments, the first configuration information includes a synchronization signal block (SSB) measurement timing configuration (SMTC) indicating a set of time and/or frequency locations for receiving and measuring SSB of the non-serving TRP, wherein the reference signals comprise SSB of the non-serving TRP, wherein at least a subset of the SSB of the non-serving TRP are received and measured at time and/or frequency locations outside of the set of time and/or frequency locations for receiving and measuring SSB of the non-serving TRP.

In some embodiments, the second configuration information comprises a report config message indicating a periodicity and/or index of the SSB of the non-serving TRP, wherein the processor is further configured to cause the UE to determine, based on the periodicity and/or index of the SSB of the non-serving TRP, the time and/or frequency locations outside of the set of time and/or frequency locations for receiving and measuring SSB of the non-serving TRP.

In some embodiments, the first configuration information is provided in a CSI-ReportConfig information element and the second configuration information is provided in a second information element, different from the CSI-ReportConfig information element, which contains a subset of the fields of the CSI-ReportConfig information element and excludes at least one field of the CSI-ReportConfig information element.

In some embodiments, the first configuration information is provided in a CSI-ReportConfig information element and the second configuration information is also provided in the CSI-ReportConfig information element.

In some embodiments, the first configuration information includes a first synchronization signal block (SSB) measurement timing configuration (SMTC) indicating a first set of time and/or frequency locations for receiving and performing L3 measurement of (e.g., based on) SSB of the non-serving TRP, wherein the second configuration information includes a second SMTC indicating a second set of time and/or frequency locations for receiving and performing L3 measurement of (e.g., based on) SSB of the non-serving TRP.

In a third set of embodiments, a base station may comprise: a radio; and a processor operably connected to the radio and configured to cause the base station to: establish a wireless link with a user equipment via a serving cell; transmit, to the UE, configuration information, the configuration information indicating: a first layer 1 (L1) measurement configuration for the serving cell; and a second L1 measurement configuration for inter-frequency measurements of at least one non-serving cell; transmit, to the UE, first reference signals via the serving cell; and receive, from the UE, reporting on L1 measurements comprising: a first measurement of the first reference signals according to the first L1 measurement configuration; and an inter-frequency measurement of the at least one non-serving cell according to the second L1 measurement configuration.

In some embodiments, the second L1 measurement configuration comprises a measurement period for inter-frequency L1 measurement based on a carrier specific scaling factor (CSSF) which is based in part on a total number of inter-frequency layers configured for L1 measurement during a measurement gap.

In some embodiments, the second L1 measurement configuration comprises an indication of a periodicity and index of second reference signals of the at least one non-serving cell.

In some embodiments, the second L1 measurement configuration comprises a synchronization signal block (SSB) measurement timing configuration (SMTC) indicating a set of time and/or frequency locations for receiving and measuring SSB of the at least one non-serving cell.

In some embodiments, the at least one non-serving cell comprises a plurality of non-serving cells, wherein SMTC indicates respective sets of time and/or frequency locations for receiving and measuring respective SSB of respective non-serving cells of the plurality of non-serving cells.

In some embodiments, the second L1 measurement configuration comprises an indication of a periodicity of at least one of: synchronization signal block (SSB) of the at least one non-serving cell; or channel state information (CSI) reference signal (CSI-RS) of the at least one non-serving cell.

A further exemplary embodiment may include a method, comprising: performing, by a wireless device, any or all parts of the preceding examples.

Another exemplary embodiment may include a device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Still another exemplary set of embodiments may include an apparatus comprising a processing element configured to cause a wireless device to perform any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station or TRP, by interpreting each message/signal X received by the UE in the downlink as message/signal X transmitted by the base station or TRP, and each message/signal Y transmitted in the uplink by the UE as a message/signal Y received by the base station or TRP.

Embodiments of the present disclosure may be realized in any of various forms. For example, in some embodiments, the present subject matter may be realized as a computer-implemented method, a computer-readable memory medium, or a computer system. In other embodiments, the present subject matter may be realized using one or more custom-designed hardware devices such as ASICs. In other embodiments, the present subject matter may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE, base station, TRP, etc.) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A baseband processor comprising circuitry configured to cause a User Equipment (UE) to:
    determine, a carrier-specific scaling factor (CSSF) based on a first number of inter-frequency layer 1 reference signal received power (L1-RSRP) measurement layers or objects;
    determine, based on at least the CSSF, a first measurement period for inter-frequency L1-RSRP measurement on a first neighbor cell, wherein:
    when a discontinuous reception (DRX) cycle length is less than or equal to a threshold, the first measurement period is determined as a first function of the CSSF, a configured periodicity for reporting, and a largest of a measurement gap repetition period (MGRP), a reference signal period, and a DRX cycle length;
    when a DRX cycle length is greater than the threshold, the first measurement period is determined as a second function of the CSSF and the DRX cycle length; and
    when operating without DRX, the first measurement period is determined as a third function of the CSSF, a configured periodicity for reporting, and a larger of the MGRP and the reference signal period;
    receive, from the first neighbor cell, at least one reference signal;
    perform at least one L1-RSRP measurement of the at least one reference signal applying the first measurement period for inter-frequency L1-RSRP measurement on the first neighbor cell; and
    transmit, to a serving cell, a report of the at least one L1-RSRP measurement.

2. The baseband processor of claim 1, wherein the at least one reference signal is a synchronization signal block (SSB).

3. The baseband processor of claim 1, wherein the first measurement period for inter-frequency L1-RSRP measurement on the first neighbor cell is further based on a total number of inter-frequency layers configured for L1 measurement during a measurement gap.

4. The baseband processor of claim 1, wherein the first measurement period for inter-frequency L1-RSRP measurement on the first neighbor cell is further based on a synchronization signal block (SSB) periodicity of the first neighbor cell.

5. The baseband processor of claim 1, wherein the first measurement period for inter-frequency L1-RSRP measurement on the first neighbor cell is further based a channel state information (CSI) reference signal (CSI-RS) periodicity of the first neighbor cell.

6. The baseband processor of claim 1, wherein the circuitry is further configured to cause the UE to perform an L1 signal to interference and noise ratio (SINR) measurement.

7. The baseband processor of claim 6, wherein the L1-SINR measurement is performed applying the first measurement period for inter-frequency L1-RSRP measurement on the first neighbor cell.

8. A method, comprising:
    determine, a carrier-specific scaling factor (CSSF) based on a first number of inter-frequency layer 1 reference signal received power (L1-RSRP) measurement layers;
    determine, based on at least the CSSF, a first measurement period for inter-frequency L1-RSRP measurement on a first neighbor cell, wherein:
    when a discontinuous reception (DRX) cycle length is less than or equal to a threshold, the first measurement period is determined as a first function of the CSSF, a configured periodicity for reporting, and a largest of a measurement gap repetition period (MGRP), a reference signal period, and a DRX cycle length;
    when a DRX cycle length is greater than the threshold, the first measurement period is determined as a second function of the CSSF and the DRX cycle length; and
    when operating without DRX, the first measurement period is determined as a third function of the CSSF, a configured periodicity for reporting, and a larger of the MGRP and the reference signal period;
    receive, from the first neighbor cell, at least one reference signal;
    perform at least one L1-RSRP measurement of the at least one reference signal applying the first measurement period for inter-frequency L1-RSRP measurement on the first neighbor cell; and
    transmit, to a serving cell, a report of the at least one L1-RSRP measurement.

9. The method of claim 8, wherein the at least one reference signal is a synchronization signal block (SSB).

10. The method of claim 8, wherein the first measurement period for inter-frequency L1-RSRP measurement on the first neighbor cell is further based on a total number of inter-frequency layers configured for L1 measurement during a measurement gap.

11. The method of claim 8, wherein the first measurement period for inter-frequency L1-RSRP measurement on the first neighbor cell is further based on a synchronization signal block (SSB) periodicity of the first neighbor cell.

12. The method of claim 8, wherein the first measurement period for inter-frequency L1-RSRP measurement on the first neighbor cell is further based a channel state information (CSI) reference signal (CSI-RS) periodicity of the first neighbor cell.

13. The method of claim 8, further comprising perform an L1 signal to interference and noise ratio (SINR) measurement.

14. The method of claim 13, wherein the L1-SINR measurement is performed applying the first measurement period for inter-frequency L1-RSRP measurement on the first neighbor cell.

15. A User Equipment (UE), comprising:
a radio; and
a processor, wherein the radio and the processor are configured to:
determine, a carrier-specific scaling factor (CSSF) based on a first number of inter-frequency layer 1 reference signal received power (L1-RSRP) measurement layers;
determine, based on at least the CSSF, a first measurement period for inter-frequency L1-RSRP measurement on a first neighbor cell, wherein:
when a discontinuous reception (DRX) cycle length is less than or equal to a threshold, the first measurement period is determined as a first function of the CSSF, a configured periodicity for reporting, and a largest of a measurement gap repetition period (MGRP), a reference signal period, and a DRX cycle length;
when a DRX cycle length is greater than the threshold, the first measurement period is determined as a second function of the CSSF and the DRX cycle length; and
when operating without DRX, the first measurement period is determined as a third function of the CSSF, a configured periodicity for reporting, and a larger of the MGRP and the reference signal period;
receive, from the first neighbor cell, at least one reference signal;
perform at least one L1-RSRP measurement of the at least one reference signal applying the first measurement period for inter-frequency L1-RSRP measurement on the first neighbor cell; and
transmit, to a serving cell, a report of the at least one L1-RSRP measurement.

16. The UE of claim 15, wherein the at least one reference signal is a synchronization signal block (SSB).

17. The UE of claim 15, wherein the first measurement period for inter-frequency L1-RSRP measurement on the first neighbor cell is further based on a total number of inter-frequency layers configured for L1 measurement during a measurement gap.

18. The UE of claim 15, wherein the first measurement period for inter-frequency L1-RSRP measurement on the first neighbor cell is further based on a synchronization signal block (SSB) periodicity of the first neighbor cell.

19. The UE of claim 15, wherein the first measurement period for inter-frequency L1-RSRP measurement on the first neighbor cell is further based a channel state information (CSI) reference signal (CSI-RS) periodicity of the first neighbor cell.

20. The UE of claim 15, wherein the radio and the processor are further configured to perform an L1 signal to interference and noise ratio (SINR) measurement.

* * * * *